United States Patent [19]

Igarashi et al.

[11] 4,045,051

[45] Aug. 30, 1977

[54] FOLDABLE WHEEL CHAIR

[75] Inventors: Jun Igarashi, Funabashi; Tadao Koga, Fukuoka; Satoshi Ueda, Kiyose, all of Japan

[73] Assignee: Yaesu Rehabili Co., Ltd., Tokyo, Japan

[21] Appl. No.: 671,487

[22] Filed: Mar. 29, 1976

[30] Foreign Application Priority Data

Apr. 2, 1975 Japan .................................. 50-39941
Aug. 21, 1975 Japan ................................ 50-101529

[51] Int. Cl.[2] ................................................ B62M 1/14

[52] U.S. Cl. ....................................... 280/644; 280/42; 280/647

[58] Field of Search ................. 280/42, 641, 642, 644, 280/647, 242 WC; 297/45, DIG. 4

[56] References Cited

U.S. PATENT DOCUMENTS

| | | | |
|---|---|---|---|
| 766,537 | 8/1904 | Simpson | 280/42 |
| 2,896,693 | 7/1959 | Schladebach | 280/42 |
| 3,136,272 | 6/1964 | Sprigman | 297/45 X |
| 3,968,991 | 7/1976 | Maclaren | 297/45 |

*Primary Examiner*—Joseph F. Peters, Jr.
*Assistant Examiner*—Terrance L. Siemens

[57] ABSTRACT

A foldable wheel chair wherein diagonal braces which are transversely foldable are coupled by universal joints to front and rear portions between two longitudinally foldable opposite side frames to prevent slidable motion. Caster wheels and drive wheels are mounted on the side frames thereby folding the wheel chair in longitudinal and transversal directions to render it compact.

4 Claims, 8 Drawing Figures

FOLDABLE WHEEL CHAIR

BACKGROUND OF THE INVENTION

This invention relates to a foldable or collapsible wheel chair and more particularly to a readily portable wheel chair which is three-dimensionally foldable to render it compact.

A conventional wheel chair of these species has been heretofore proposed so that diagonal braces have central portions journaled between two opposite side frames have upper pivot portions longitudinally slidable, thereby folding and reducing the size of the chair inwardly thereof. This does not, however, enable physically handicapped persons to transport or carry the chair. In other words such a wheel chair is only arranged in order for economizing space out of use.

According to the present invention a foldable wheel chair is adapted so that a pair of foldable diagonal braces are connected to two foldable opposite side frames to form a two-dimensional link mechanism and thus fold the chair in a three-dimensional manner thereby rendering it compact. As a result physically handicapped persons may carry the chair indoor or in an automobile or the like and readily assemble it therein without aid of the others, and have easy riding to reach a desired destination thus increasing their sphere of action.

SUMMARY OF THE INVENTION

It is, therefore, a primary object of the present invention to provide a wheel chair which includes a horizontal lower frame. Two opposite side frames are downwardly folded to longitudinally and transversely reduce the wheel chair in dimensions. A pair of diagonal braces are connected to the lower frame and are telescoped along a plane perpendicular to the side frame to prevent slidable motion.

Another object of the present invention is to provide a wheel chair which employs a three-dimensional link mechanism such as frame components each fabricated from square tube or pipe to ensure mutual mechanical operation thereof.

A further object of the present invention is to provide a wheel chair which has minimum components and is of simple design, and which affords the use of light metal material to reduce the chair wheel in weight to approximately 12kg, so that physically handicapped persons can transport and carry the wheel chair without aid of the others.

Still another object of the present invention is to provide a wheel chair which is provided with an armrest supporting back post telescopically and vertically mounted to an upper frame over which a sheet for the chair seat is spread to thus prevent the wheel chair from increasing its height due to longitudinal and transverse reduction of the chair in dimensions.

Yet another object of the present invention is to provide a wheel chair which is adapted so that front and rear lower frames of each of side frames is longitudinally folded and slidable laid on a base post to further reduce the wheel chair in height when folded.

Further objects and additional features of the invention will become apparent from the following detailed description and annexed drawings, wherein.

DESCRIPTION OF THE PREFERRED EMBODIMENT

Referring to the accompanying drawings wherein similar characters designated similar parts, two opposite side frames are generally indicated at 10.

Figure 4:
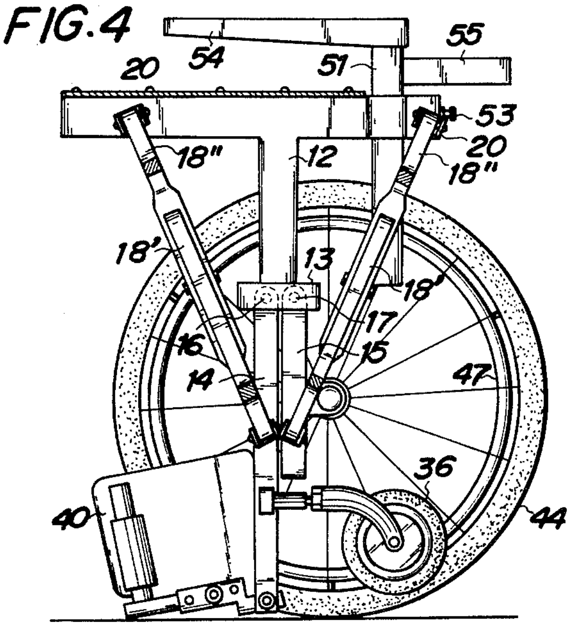
FIG. 4 is a section of the wheel chair of FIG. 3, folded in a transverse direction, as viewed from the side elevation.
Figure 6:
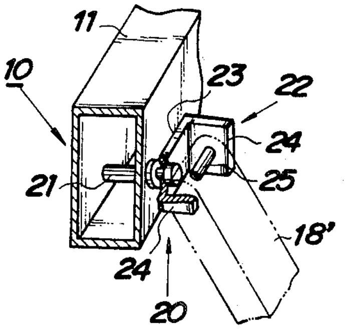
FIG. 6 is a perspective view, enlarged of an upper frame to which a diagonal brace is journaled by an universal joint.

A foldable wheel chair structure comprises a pair of the side frames which include upper frames 11, base posts 12 downwardly extending from the upper frames at the intermediate sections thereof, and downwardly directed channel members 13. All the components for the wheel chair structure are fabricated from light metal rectangular pipes. Front and rear lower frames 14, 15 are received in each of the channel members 13 and pivotally mounted therein by pivot bolts 16, 17. The lower frames 14, 15 are held vertical side by side, as shown in FIG. 4 when the wheel chair is folded, but they are adapted to align with each other in a horizontal relation when the wheel chair is unfolded, as the lower frames are engaged with the channel member 13. The upper frames 11 are in cooperation with the each other to define a chair element. One pair of universal joints 20 are disposed inwardly of the upper frame at the opposite ends thereof, and the other pair of universal joints 20 are arranged inwardly of the lower frames at first ends thereof, respectively to pivotally support front and rear diagonal braces 18 along a plane perpendicular to the side frames 10. A support shaft 21 passes through the side frame 10 and extends inwardly thereof. A mount member 22 having a U-shaped section is rotatably journaled to one end of the shaft 12 by its base 23. The mount member 22 includes side walls 24 between which a pin 25 is fixed. The diagonal brace 18 is pivotally journaled to the pin 25. The diagonal brace 18 comprises one brace 18' and another brace 18" passing through the slit of the former. They are pivoted by a pivot bolt 19 at the center thereof to pivotally cross each other.

Figure 1:
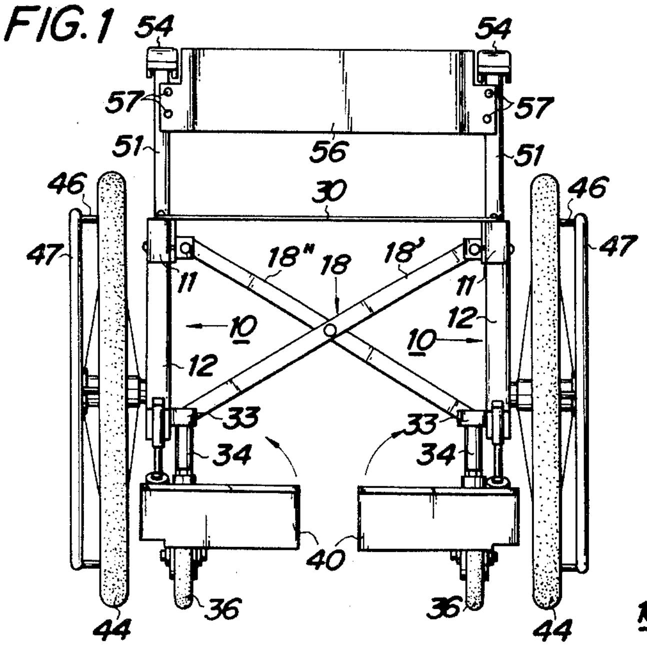
FIG. 1 is a front view of a wheel chair according to an embodiment of the present invention.
Figure 2:
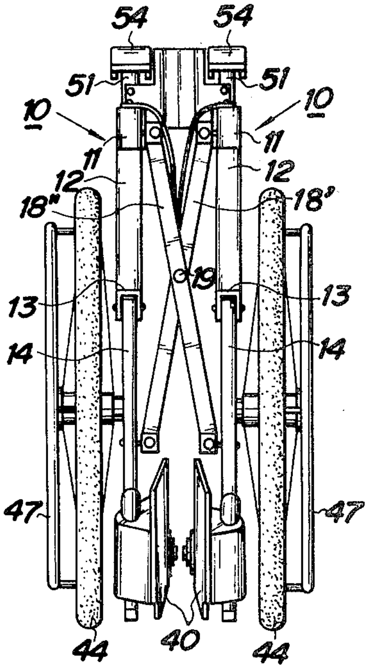
FIG. 2 is a view similar to FIG. 1 but showing the wheel chair folded in a longitudinal direction.
Figure 5:
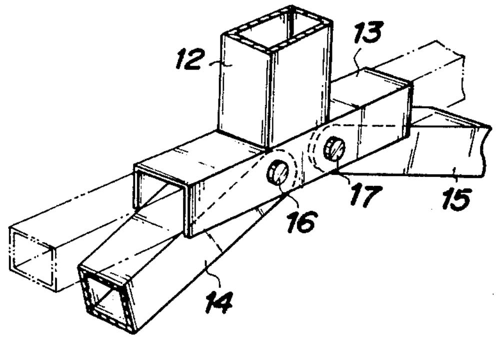
FIG. 5 is a perspective view, enlarged of front and rear lower frames in a pivotal movement.
Figure 3:
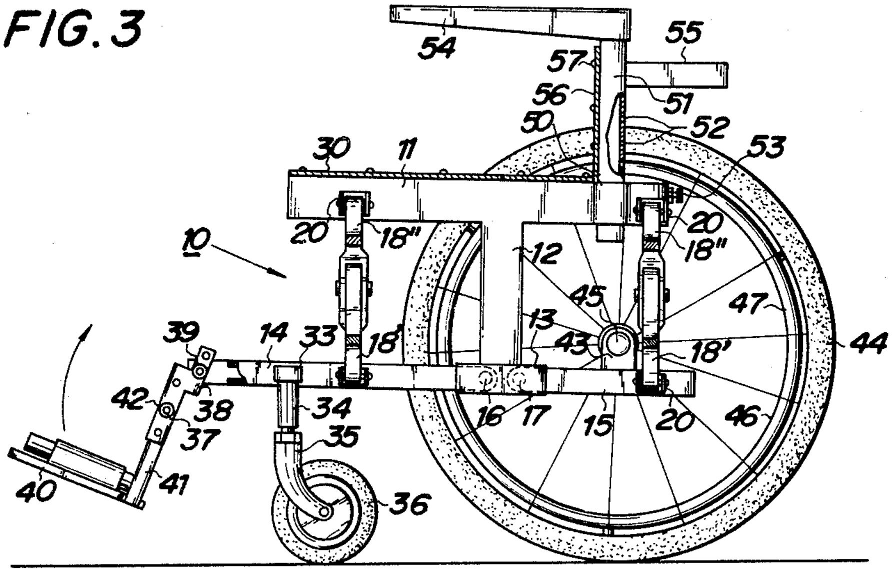
FIG. 3 is a section of the wheel chair shown in FIG. 1, as viewed from the side elevation when part are partially broken away.

A sheet or web 30 for a chair seat is spread over the two upper frames 11. The lower frames 14, 15 are folded as shown in FIG. 4 if the seat 30 is raised by hand from below, to thus fold the braces 18' and 18" downwardly as shown in FIG. 2. At that time the braces are pivoted along the lower braces 14, 15 and inwardly of the wheel chair.

A pair of housings 34 are mounted by brackets 33 on the respective lower frames 14 at the inner sides thereof and are provided with spindles for forks 35 on caster wheels 36.

The front lower frame 14 is bifurcated at the other end thereof to pivotally mount thereon a bracket 38 having a square sleeve 37, at one end thereof, by means of a pivot bolt 39. A footrest support 41 carries a foldable footrest and is telescopically received in the sleeve 37. The footrest 40 when folded is upwardly pivoted to allow the footrest support 41 to enter into the sleeve 37. The footrest support is then swung to minimize space.

The rear frame 15 is provided at its center with a shaft support 43 on which a shaft 45 for a drive wheel 44 is mounted. The drive wheel 44 carries a hand rim 47 over a bracket 46 secured to the wheel.

The upper frame 11 includes an opening 50 through which a back post 51 passes vertically and slidably. A plurality of apertures 52 are formed in the back post 51 to receive a pin 53 passing through the upper frame 11 at the rear end thereof. With this arrangement, the apertures 52 may be indexed by the pin 53 to thus adjust the height of the back post. The back post 51 is provided at its upper end with a horizontally extending armrest 54 and a push handle 55 for the wheel chair, which extends in the direction opposite to the armrest. A back sheet 56 is spread between the two back posts 51 to be removably mounted thereon by means of hooks 57. In folding the wheel chair, the back sheet 56 is removed from the back posts, and the pin 51 is also removed to then lower the back post and in alignment with one of the apertures to maintain the back post in position as shown in FIG. 4.

On the other hand, if the front and rear lower frames 14, 15 are folded, the caster wheel 36 and the drive wheel 44 are moved toward the center of the wheel chair to reduce the latter in width by about ½.

Figure 7:
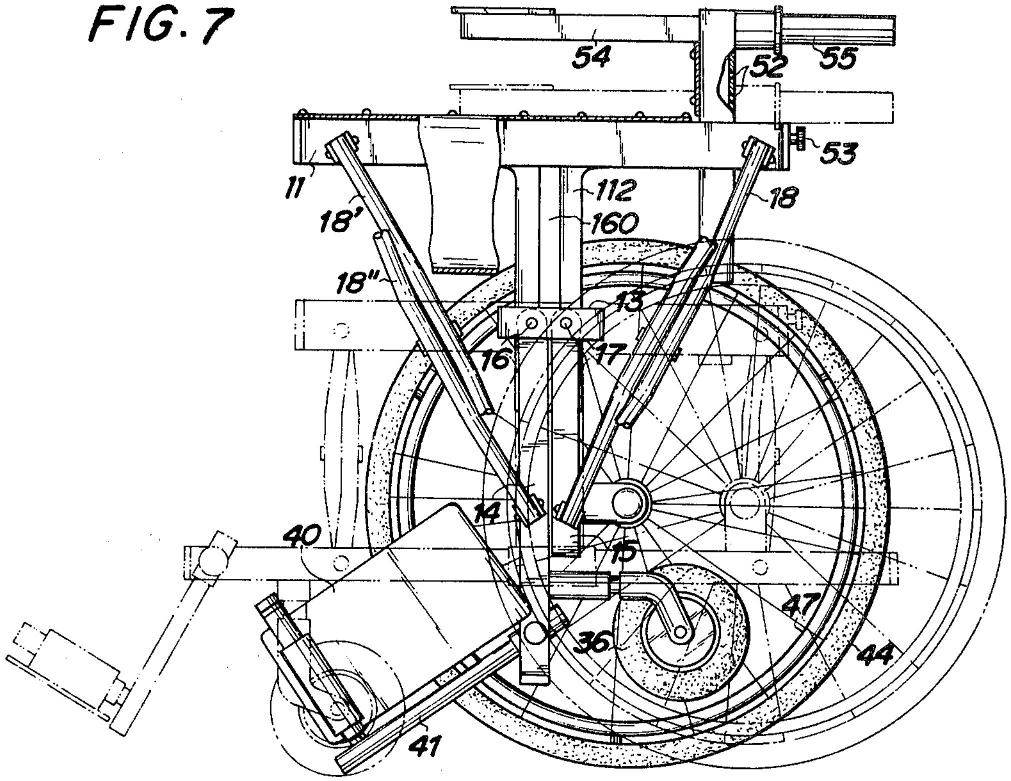
FIG. 7 is a section of a wheel chair according to another embodiment of the present invention, as viewed from the side elevation.
Figure 8:
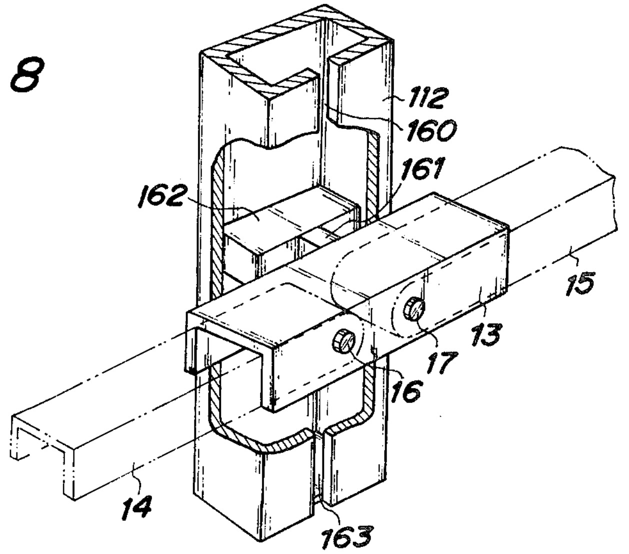
FIG. 8 is a perspective view, with enlarged back post in which the front and rear lower frame is mounted.

In FIGS. 7 and 8, there is shown a second embodiment of the invention wherein a vertical and hollow base post 112 has a slit 16 along its one wall and has a C-shape. The downwardly directed channel member 13 has at its outer wall a bracket 161 and a slider 162 fixed thereto to slidably engage in the base posts 112. The channel member 13 receives therein the front and rear lower frames 14, 15 which are pivoted by the pivot bolts 16, 17 to swing the frames from the horizontal position to the vertical position for joining the frames. Thus, the frames 14, 15 are opened horizontally to abut against the under surface of the channel member 13 and is held in position. A stopper 163 is mounted forwardly of the base post 112 to partially cover the slit 16 to prevent the slider 162 from being removed from the base posts 112.

With this arrangement, the base posts 112 are slidably engaged by the frames 14, 15 to thus further reduce the wheel chair in height by sliding thereinto.

Although the invention has been described with reference to specific means for practicing the invention, it is apparent that many modifications may be made by one skilled in the art, and accordingly, it is intended that the scope of the invention be limited only as defined in the following claims.

What is claimed is:

1. A foldable wheel chair comprising a three-dimensional link mechanism with two opposite side frames including horizontal upper frames with central portions base posts, said central portions being fixed to upper ends of said base posts, front and rear lower frames pivotally mounted on said base posts to swing from the vertical to the horizontal position universal joints, and a pair of diagonal braces pivotally mounted by said universal joints on said upper frames, the front lower frame at their forward ends, and on the upper and rear lower frames, said diagonal braces being folded simultaneously by folding the front and rear lower frames to reduce the distance between said two opposite side frames and simultaneously bring a caster wheel and a drive wheel mounted on the front and rear lower frames closer together.

2. A foldable wheel chair as defined in claim 1 wherein said base posts have at their lower ends downwardly directed channel members with central portions fixed to said base posts, said channel member receiving therein the front and rear lower frames, said front and rear lower frames being pivotally journaled to said channel members, said front and rear lower frames abutting against said channel members when they are in horizontal position.

3. A foldable wheel chair as defined in claim 1 including a vertically slidable back post in each of the upper frames rearwardly thereof.

4. A foldable wheel chair as defined in claim 1 including a channel member mounted pivotally said front and rear lower frames, said base posts having a wall with a vertical slot wherein said channel member is slidable along said base posts.

* * * * *